(12) United States Patent
Malgorn et al.

(10) Patent No.: US 11,167,227 B2
(45) Date of Patent: Nov. 9, 2021

(54) FILTERING ASSEMBLY COMPRISING A FILTER CARTRIDGE

(71) Applicant: Cummins Filtration Sarl, Quimper (FR)

(72) Inventors: Gérard Malgorn, Quimper (FR); Pierrick Bonzi, Tregunc (FR); Gauthier Mestdag, Plogastel-Saint-Germain (FR); Loick Menez, Fouesnant (FR)

(73) Assignee: CUMMINS FILTRATION SARL, Quimper (FR)

( * ) Notice: Subject to any disclaimer, the term of this patent is extended or adjusted under 35 U.S.C. 154(b) by 130 days.

(21) Appl. No.: 16/243,649

(22) Filed: Jan. 9, 2019

(65) Prior Publication Data

US 2019/0143251 A1 May 16, 2019

Related U.S. Application Data

(63) Continuation of application No. 15/123,845, filed as application No. PCT/EP2015/054113 on Feb. 27, 2015, now Pat. No. 10,238,999.

(30) Foreign Application Priority Data

Mar. 10, 2014 (FR) ...................................... 1451929

(51) Int. Cl.
*B01D 29/96* (2006.01)
*B01D 35/30* (2006.01)
(Continued)

(52) U.S. Cl.
CPC ............. *B01D 29/96* (2013.01); *B01D 29/15* (2013.01); *B01D 29/21* (2013.01); *B01D 35/02* (2013.01);
(Continued)

(58) Field of Classification Search
None
See application file for complete search history.

(56) References Cited

U.S. PATENT DOCUMENTS 5,308,482 A    5/1994   Mead
5,685,985 A *  11/1997  Brown ................... B01D 29/96
                                                            210/450
(Continued)

FOREIGN PATENT DOCUMENTS

CN          101405068        4/2009
DE     20 2006 018 334       5/2008
(Continued)

OTHER PUBLICATIONS

Office action issued for Indian Patent Application No. 201647031531, dated Jan. 29, 2019, 6 pages.
(Continued)

*Primary Examiner* — Chester T Barry
(74) *Attorney, Agent, or Firm* — Foley & Lardner LLP

(57) ABSTRACT

The present invention relates to a filtering assembly (1) for filtering at least one fluid circulating in particular in an engine or a hydraulic device, comprising: a filter body (2), which comprises a vessel (3) and a head (4), the vessel (3) and the head (4) being provided to engage with one another in order to close the filter body (2), in particular by screwing; a tube (15), in particular a central tube, which is inside the filter body (2) and extends along a longitudinal axis (X); a removable filtration cartridge (16,) which is accommodated in the filter body (2) and includes an upper end plate (20), a lower end plate (21) and a filtration medium (22) which extends between the upper (20) and lower (21) end plates, the filtering medium (22) having a tubular opening (17) for surrounding the tube (15), characterized in that the upper end plate (20) comprises first reversible rigid-connection means (25) and in that the vessel (3) comprises second
(Continued)

reversible rigid-connection means (26) which are complementary to the first reversible rigid-connection means (25), such as to enable the filtration cartridge (16) to stay in position in the vessel on the one hand, and in the filtering assembly (1) on the other hand, only by rigidly connecting the first and second reversible rigid-connection means (25, 26).

15 Claims, 4 Drawing Sheets

(51) Int. Cl.
*B01D 29/21* (2006.01)
*B01D 29/15* (2006.01)
*B01D 35/02* (2006.01)
B01D 27/08 (2006.01)

(52) U.S. Cl.
CPC .............. *B01D 35/30* (2013.01); *B01D 27/08* (2013.01); *B01D 2201/295* (2013.01); *B01D 2201/302* (2013.01); *B01D 2201/304* (2013.01); *B01D 2201/4084* (2013.01); *B01D 2201/4092* (2013.01)

(56) References Cited

U.S. PATENT DOCUMENTS

| | | | |
|---|---|---|---|
| 9,233,322 B1 | 1/2016 | Huda et al. | |
| 2005/0035041 A1* | 2/2005 | Nohren, Jr. | B01D 61/20 |
| | | | 210/209 |
| 2010/0032359 A1 | 2/2010 | Gillenberg et al. | |
| 2010/0089805 A1 | 4/2010 | South et al. | |
| 2013/0056409 A1* | 3/2013 | Sawant | B01D 35/30 |
| | | | 210/442 |
| 2013/0102994 A1* | 4/2013 | Gibler | A61M 5/31513 |
| | | | 604/506 |
| 2015/0246824 A1 | 9/2015 | Boudreau et al. | |
| 2016/0310941 A1* | 10/2016 | Rajagopal | B01L 3/50215 |
| 2020/0222846 A1* | 7/2020 | Nelson | F02M 35/0203 |

FOREIGN PATENT DOCUMENTS

| | | |
|---|---|---|
| EP | 2 644 242 A1 | 10/2013 |
| WO | WO-97/22397 A1 | 6/1997 |
| WO | WO-2008/128150 | 10/2008 |
| WO | WO-2013/033453 | 3/2013 |
| WO | WO 2013/144459 A1 | 10/2013 |

OTHER PUBLICATIONS

International Search Report and Written Opinion for PCT/EP2015/054113, dated Jun. 25, 2015, 8 pages.
Non-Final Office Action on U.S. Appl. No. 15/123,845 dated Jun. 28, 2018.
Notice of Allowance on U.S. Appl. No. 15/123,845 dated Nov. 19, 2018.
Written Opinion and Search Report issued for French Patent Application No. FR 1759450, dated Apr. 11, 2018, including English-language translation of Written Opinion, 8 pages.
First Office Action issued for Chinese Patent Application No. CN 2019103875794, dated Feb. 2, 2021, including translation, 12 pages.

* cited by examiner

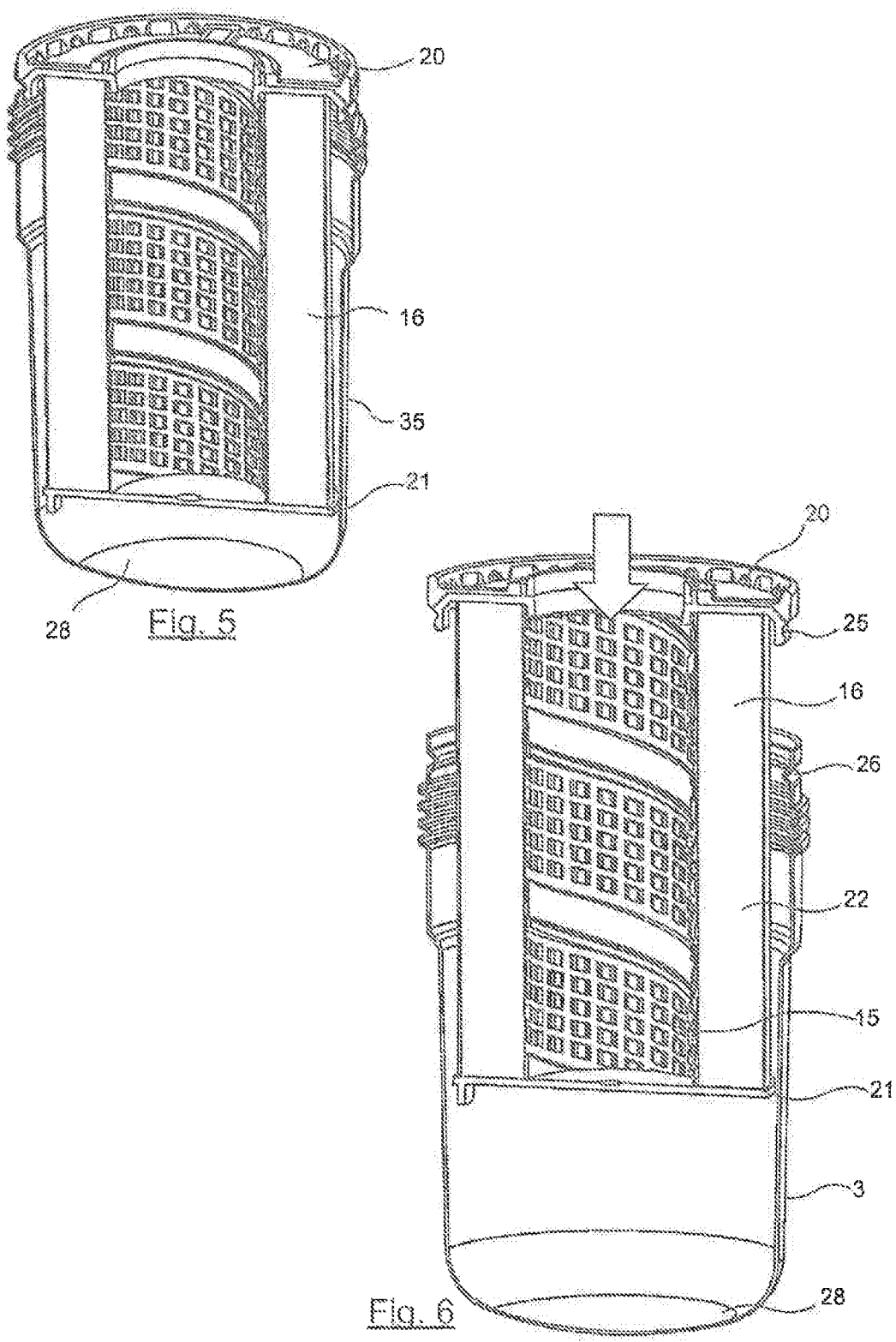

FILTERING ASSEMBLY COMPRISING A FILTER CARTRIDGE

CROSS-REFERENCE TO RELATED APPLICATIONS

The present application is a continuation application of U.S. patent application Ser. No. 15/123,845, filed on Sep. 6, 2016, now U.S. Pat. No. 10,238,999, which is a U.S. national stage application claiming the benefit of International Application No. PCT/EP2015/054113, filed on Feb. 27, 2015, which claims the benefit of and priority to French Patent Application No. 1451929, filed on Mar. 10, 2014. The contents of these applications are incorporated herein by reference in their entirety.

1. FIELD OF THE INVENTION

The field of the invention is the design and production of filtering assemblies used to filter fluids circulating particularly in motors or hydraulic equipment, the fluids essentially being oil or fuel.

Such filtering assemblies are generally composed of a filter body, comprising a vessel or shell and a head inside which a removable filtration cartridge is disposed, having a filtration medium generally cylindrical in shape surrounding a tubular opening and which can be made of paper, for example, cardboard or felt or another porous material, such as a synthetic or non-synthetic unwoven material. The filtration cartridge also comprises two end plates demarcating the filtration medium and allowing the installation of the filtration cartridge inside the filter body.

Such a filtration cartridge generally cooperates with a tube, particularly central, which may or may not be integral with the end plates, and may or may not be integral with the filtration cartridge, the outside diameter of which is close to the inside diameter of the tubular opening surrounded by the filtration medium, particularly so as to limit the deformations of the medium under the effect of the pressure being exerted inside the filtering assembly.

The end plates are formed by an upper end plate and a lower end plate. The purpose of the end plates is particularly to participate in sealing the filtration cartridge and to allow the attachment of the filtration cartridge to the permanent part of the filtering assembly.

The filtration cartridge is removable in order to allow its replacement when it has reached the end of its working life, by a new filtration cartridge.

2. PRIOR ART

Known filtration cartridges comprise, in addition to the filtration cartridge, at least one gasket to form the seal between the head and the vessel. An additional gasket can be added between the upper end plate and a threaded holder.

Moreover, known filtering assemblies comprise means for holding the filtration cartridge in position inside the vessel, generally comprising a threaded holder, a collar, a gasket between threaded holder and collar, and a spring.

Such filtering assemblies therefore comprise a significant number of different parts, generally more than 11 different parts for a so-called spin-on filter. There is thus a need to reduce the number of different components to produce a filtering assembly of this type.

Moreover, as regards ecological concerns, there is a need to limit the quantity of discarded material when the filtration cartridge is replaced.

3. OBJECTIVES OF THE INVENTION

An objective of the invention is especially to respond to all or part of these needs.

In particular, according to at least one embodiment, an objective of the invention is to provide a filtering assembly with a limited number of parts, especially fewer than or equal to five different parts.

Another objective of the invention is to minimize the number of materials discarded with the filtration cartridge when it is replaced.

Another objective of the invention is to provide an efficient filtering assembly, particularly in terms of sealing, without adding additional gaskets.

4. DESCRIPTION OF THE INVENTION

To achieve all or part of these objectives, the invention proposes a filtering assembly to filter at least a circulating fluid, especially in a motor or hydraulic equipment, comprising:
 a filter body having a vessel and a head, the vessel and the head being provided so as to cooperate together to close the filter body, especially by screwing,
 a tube, especially central, inside the filter body extending along a longitudinal axis (X), the tube being integral with the head or the filtration cartridge,
 a removable filtration cartridge housed in the filter body and comprising an upper end plate, a lower end plate and a filtration medium extending between the upper and lower end plates, the filtration medium having a tubular opening to surround the tube,
characterized in that the upper end plate has first reversible rigid connecting means and in that the vessel includes second reversible rigid connecting means complementary to the first reversible rigid connecting means, so as to enable the filtration cartridge to be maintained in position in the vessel on the one hand, and in the filtering assembly on the other hand, solely by the securing of the first and second reversible rigid connecting means.

Thanks to the invention, the filtration cartridge is held in position as a result of the securing of the upper end plate to the vessel, which in particular avoids having to provide additional means to allow the filtration cartridge to be held in the filter body. In this way, the number of parts comprising the filtering assembly can be reduced.

The upper end plate can be composed of a single part and comprises a first element made of a first material and a second element made of a second material, the upper end plate being formed by overmolding of the second element onto the first element.

For example, the first element can be made of a rigid material while the second element can be produced from a flexible material providing the necessary seal, without adding separate gasket(s).

The first material, for example, comprises a polyamide resin particularly allowing the overlay of the filtration medium, the properties of which advantageously allow the filtration cartridge to be held rigidly in the vessel.

The second material for example is chosen from the group composed of a thermoplastic elastomer, a synthetic or natural rubber, or vulcanized, having properties that allow a compression set compatible with a sealing function. The second material can then be of any other material having the property of being able to be overmolded onto the first material, and advantageously having hardness characteristics that are compatible with the sealing function.

The second element of the upper end plate can be configured to ensure at least one seal with respect to the exterior of the filter body, while ensuring the seal between the inside and outside of the filter body where the head and vessel cooperate.

As a result of this aspect of the invention, the seal of the closure of the filter body is ensured by the upper end plate of the filtration cartridge, which has the particular advantage of not needing the addition of another gasket, for example a ring seal or O-ring or collar.

The tube can form part of the filtration cartridge or of the head, in which case it is reusable. For example, the tube extends in proximity to, especially in contact with, the filtration medium, demarcating an inner space of the tube. The tube can be free and not have a sealing function.

The first and second reversible rigid connecting means cooperate for example by snapping on, screwing or force fit. As a result of this mode of cooperation, it is easy for an operator to position the filtration cartridge in the filtering assembly or to remove it therefrom. In the event of force fit, the vessel and the filtration cartridge remain permanently integral with one another, and the replacement of the filtration cartridge during a maintenance operation involves the simultaneous replacement of the vessel.

In this case, the first reversible rigid connecting means include for example at least one snap-on tab, particularly produced in the first element of the upper end plate. The second reversible rigid connecting means comprise for example a rib protruding towards the interior of the filter body, particularly produced in an upper portion of the vessel and extending over the entire perimeter of the vessel.

Such an embodiment requires the formation of the rib when the vessel is manufactured, said rib being for example produced in or near threading enabling the head to be secured to the vessel to the head by screwing. The rib can for example have a V shape in longitudinal cross-section. The seal between [the] second element of the upper end plate is, at the vessel, advantageously formed by the rib which works in axial compression on the one hand and the vertical wall of the vessel working in radial compression during swelling of the second material on the other hand. The seal at the head is for example provided by a shape of the head complementary or not to the shape of the second material. The invention makes it possible to reduce the number of parts, thus enabling a direct seal between vessel and head, contrary to a screwed filter of the prior art, in which a collar inserted between head and vessel requires having two seals in the vessel/collar/head series.

The first and second reversible rigid connecting means are advantageously configured to ensure that the filtration cartridge is held in position laterally and vertically. Thanks to this aspect of the invention, the filtration cartridge does not need additional means to maintain it inside the filter body, which again decreases the number of parts necessary to produce the filtering assembly.

The vessel can have a substantially cylindrical wall and a bottom. In this case, the upper end plate has for example a generally ring shape with an outside diameter substantially equal to the inside diameter of the substantially cylindrical wall of the vessel. The filtration medium has an outside diameter that can be smaller than the outside diameter of the upper end plate, in such a way that a space, particularly substantially cylindrical, is formed between the substantially cylindrical wall of the vessel and the filtration medium.

In this latter case, the upper end plate, particularly the first element of the upper end plate, can include a plurality of openings disposed in a peripheral region of the upper end plate to allow the passage of fluid, particularly the fluid to be filtered, from the head towards said space.

Thanks to the invention, according to this embodiment, the upper end plate allows the circulation of the fluid, particularly the fluid to be filtered, while ensuring that the filtration cartridge is held in position by its cooperation with the vessel.

Advantageously, the head can include an intake duct for the fluid to be filtered and an outlet duct for the filtered fluid. In this case, the lower end plate can be configured to form a plug preventing any filtered fluid from flowing towards the bottom of the vessel.

Thus, according to this embodiment of the invention, the filtered fluid will be able to be evacuated by a filtered fluid outlet duct located in the head, passing through a central opening of the upper end plate. In this embodiment, the filtered fluid outlet duct can be produced in the head of the filter body.

5. LIST OF FIGURES

Other characteristics and advantages of the invention will be seen from the following description of a particular embodiment thereof, provided by way of simple illustrative and non-limiting example, and from the appended drawings in which.

Figure 1:
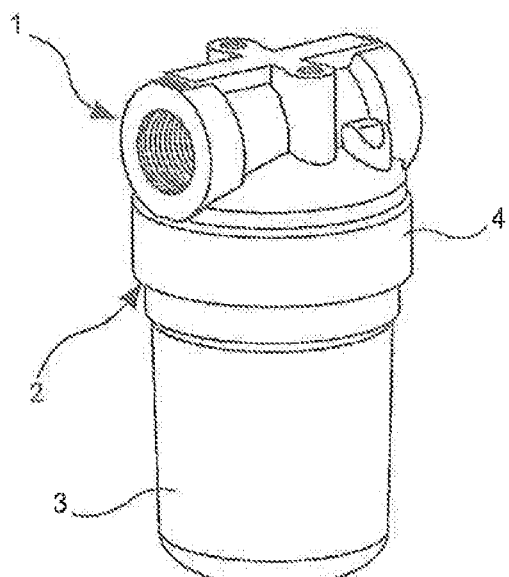
FIG. 1 is a schematic illustration in perspective of a filtering assembly according to one embodiment of the invention.
Figure 2:
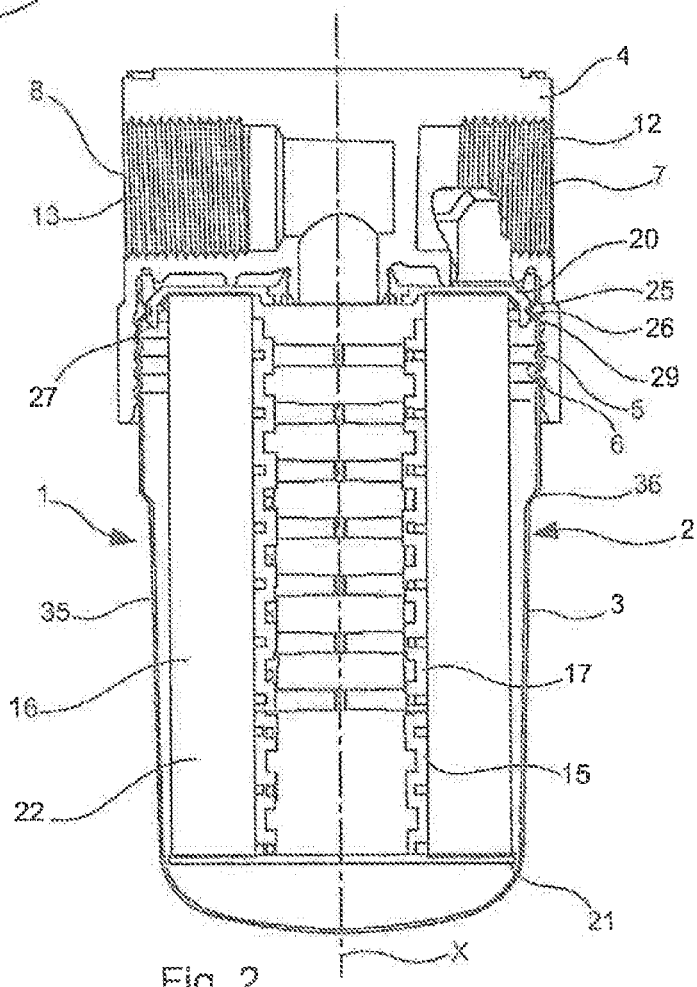
FIG. 2 represents schematically, partially in cross-section, partially in perspective, the filtering assembly of FIG. 1.
Figure 3:
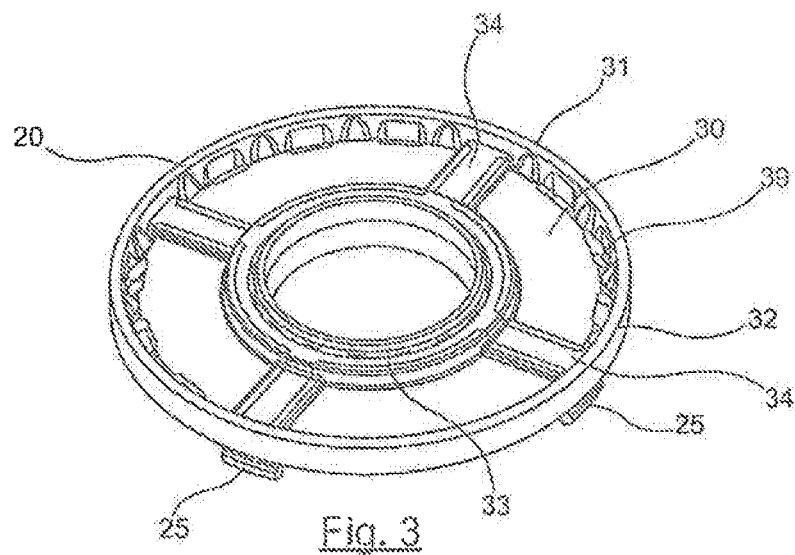
FIG. 3 represents schematically and in perspective, just the end plate of the filtering assembly of FIGS. 1 and 2.
Figure 4:
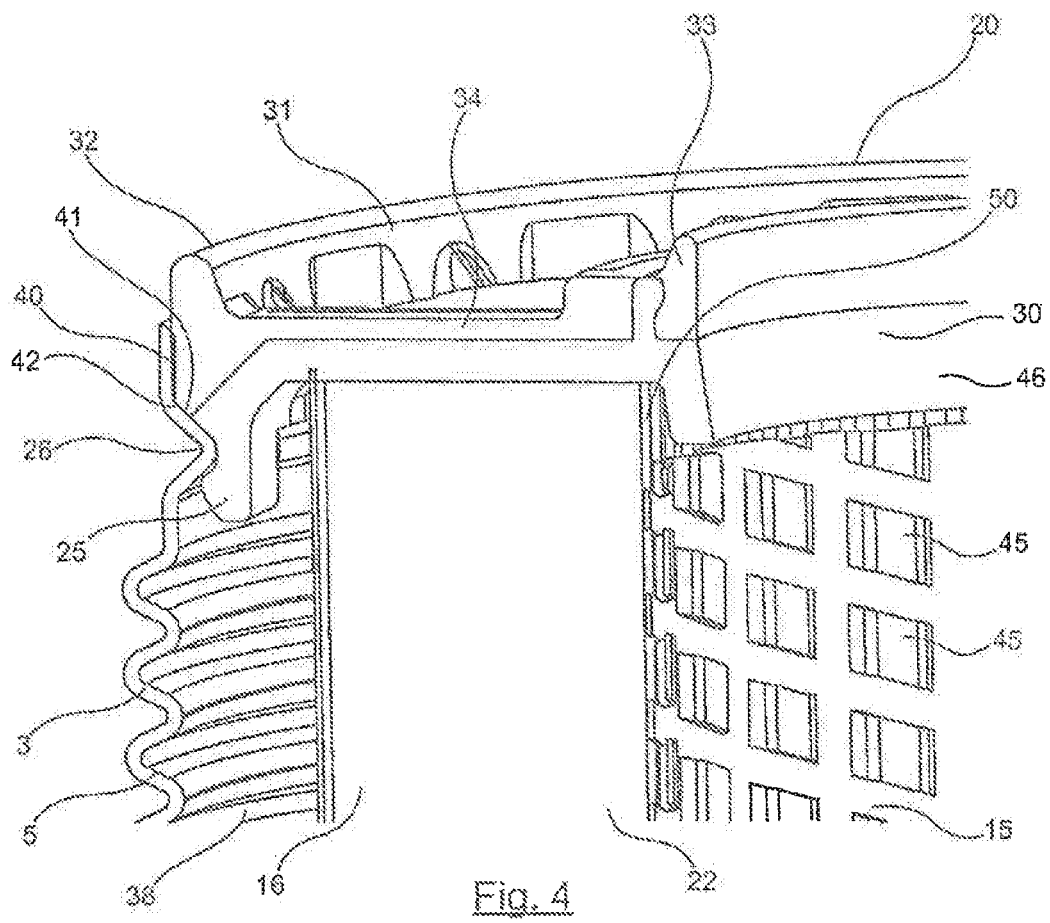
Figure 7:
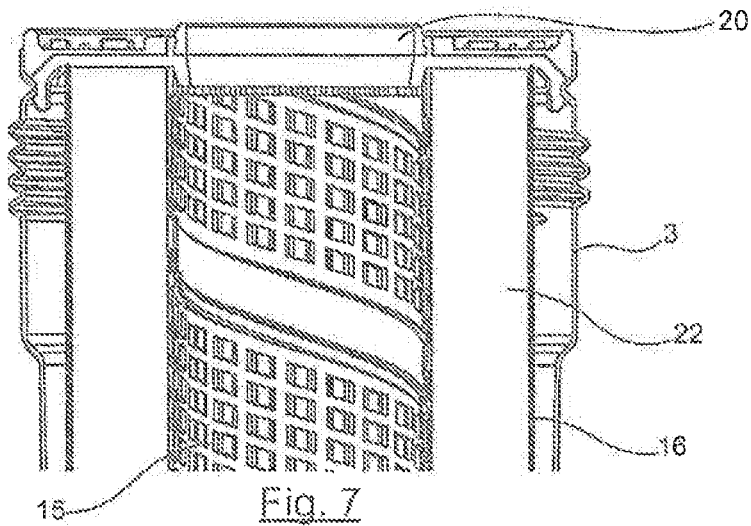
Figure 8:
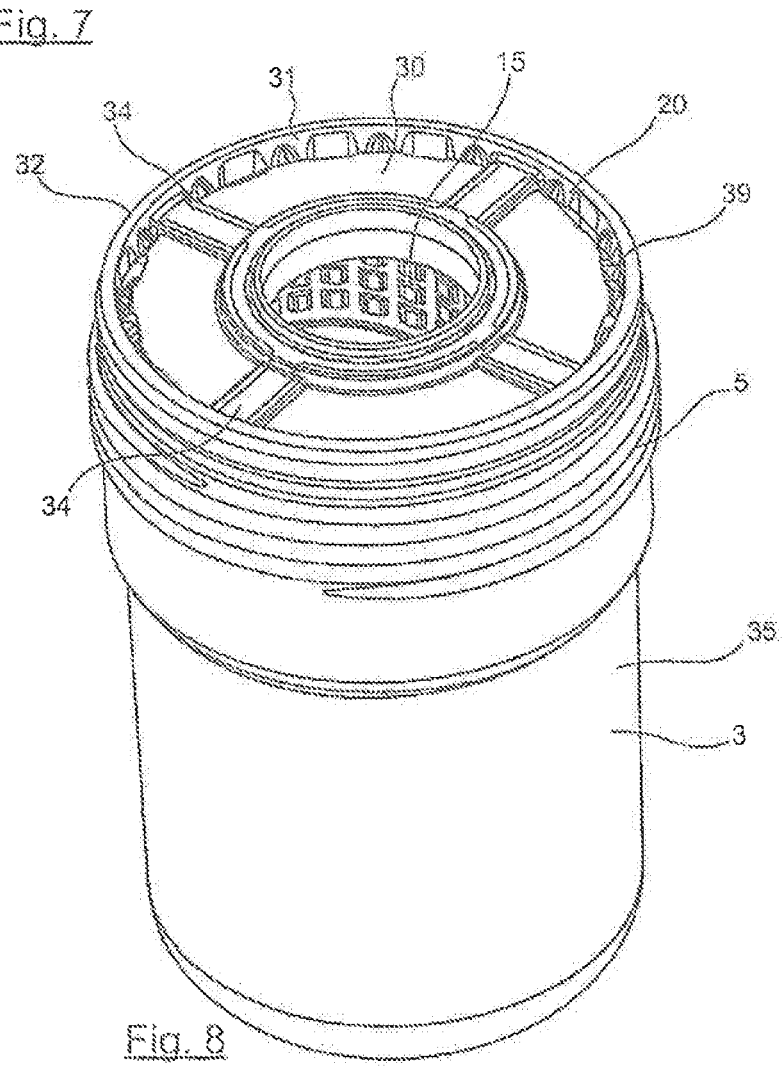

FIG. 4 partially, schematically and in perspective represents the cooperation between the upper end plate and the vessel in the embodiment illustrated in FIGS. 1 to 3;

FIG. 5 represents schematically and partially, in cross-section, the filtration cartridge cooperating with the vessel, in the filtering assembly of FIGS. 1 to 4, without the head;

FIG. 6 represents schematically and partially, in longitudinal cross-section, the rigid connection of the filtration cartridge with the vessel, in the embodiment of FIGS. 1 to 5;

FIG. 7 is a view in longitudinal cross-section, schematically and partially illustrating the rigid connection between the vessel and the filtration cartridge; and FIG. 8 represents schematically and in perspective the filtering assembly of FIG. 1 without the head.

6. DESCRIPTION OF ONE PARTICULAR EMBODIMENT

Represented in FIG. 1 is a filtering assembly 1 according to one embodiment of the invention having a filter body 2, closed in this example, comprising a shell or vessel 3 and a head 4. The filtering assembly 1 also includes a removable filtration cartridge 16, housed in the body of the filter 2. The vessel 3 and the head 4 are intended to cooperate together in order to close the filter body, by screwing in this example, as can be seen in particular in FIG. 2. Indeed, the head 4 has threading 5 and the vessel 3 has complementary threading 6 enabling the closure of the filter body 2 by screwing the head 4 with the vessel 3. It should be noted in this example that the head 4 is attached to the frame of the application (not illustrated). The vessel 3 is disconnected from the head 4 when the filtration cartridge is changed.

FIGS. 1 and 2 also illustrate an intake duct 7 for the fluid to be filtered, integrated into the head 4 as well as an outlet duct 8 for the filtered fluid also integrated into the head 4. The intake duct 7 allows the fluid to be filtered to be routed towards a peripheral zone of the vessel 3 while the outlet duct 8 for the filtered fluid allows the clean filtered fluid to be extracted from a central portion of the vessel 3, as will be explained hereinafter. As can be seen in the figures, the intake duct 7 and outlet duct 8 comprise respective threading 12 and 13 allowing them to be rigidly connected by screwing two other elements, particularly pipes, outside the filtering assembly 1, not represented in order to maintain clarity of the drawing, for routing the fluid.

In this example the vessel 3 has a substantially cylindrical wall 35 extending along a longitudinal axis X and connected to a bottom 28 of the vessel 3. In the illustrated example, the substantially cylindrical wall 35 has a widening 36 in such a way that the diameter of the vessel 3 is greater in an upper portion of the vessel 3 that includes the threading 6. Such a widening enables the vessels to be stacked when they do not contain filtration cartridges, in order to limit the storage space occupied by empty vessels. It is obvious of course that if the vessel 3 does not have this widening, this does not go beyond the scope of the invention.

The filtering assembly 1 also includes a tube 15, central in this example, inside the filter body 2 and extending along the longitudinal axis X.

The filtration cartridge 16 comprises an upper end plate 20, a lower end plate 21 and a filtration medium 22 extending between the upper end plate 20 and lower end plate 21, the filtration medium 22 having a tubular opening 17 to surround the tube 15.

According to the invention, the upper end plate 20 has first reversible rigid connecting means 25 and the vessel 3 has second reversible rigid connecting means 26 that is complementary to the first reversible rigid connecting means 25, so as to enable the position of the filtration cartridge 16 to be maintained in the filtering assembly 1 simply by the connection of the first and second reversible rigid connecting means 25 and 26.

In the illustrated example, the first reversible rigid connecting means 25 includes a plurality of snap-on tabs 27, four in number in the illustrated example. The second reversible rigid connecting means 26 comprises a rib 29 formed to project into the interior of the filter body 2, produced in this example in an upper portion of the vessel 3, near the threading 6, and extending over the entire periphery of the vessel 3. The rib 29 is V-shaped in longitudinal cross section along the axis X.

The upper end plate 20 is composed of a single piece, visible in FIG. 3, formed by overmolding onto a first element 30 of a first material, a second element 31 of a second material. Advantageously the first material includes a polyamide resin while the second material includes a thermoplastic elastomer such as polyurethane. The upper end plate 20 thus includes the first element 30, more rigid, and the second element 31, more flexible, which confers different functions related to the cooperation, within the same part, of these different materials.

In this example, as can be seen, the first element 30 is substantially ring shaped and includes the first reversible rigid connecting means 25. The second element 31 is intended to form the seal on the inner and outer periphery of the generally ring shaped upper end plate 20. The second element 31 has an outer ring 32 and an inner ring 33, overmolded onto the first element 30, the first ring 32 and second ring 33 being connected in this example by integral bridges 34, four in number in the illustrated example, the bridges 34 also forming part of the second element 31. The second element 31 of the upper end plate 20 is configured to ensure at least the seal with respect to the exterior of the filter body 2, while playing the part of a sealing gasket between the interior and exterior of the filter body 2 at the place of cooperation between head 4 and vessel 3, as can be seen more particularly in FIG. 4.

In the illustrated example, the first and second reversible rigid connecting means 25 and 26 are configured to ensure that the filtration cartridge 16 is maintained in position laterally and vertically.

As can be seen in FIG. 4, the outer ring 32 of the second element 31 of the upper end plate 20 comes in contact with the cylindrical inner wall 35 of the vessel 3, at an upper end 40 thereof. The outer ring 32 also has, at the lower part, a portion 41 coming in contact with an upper part 42 of the rib 29 in order to ensure the seal, on the upper arm of the horizontal V of the rib 29.

As can be seen in the figure, the tube 15 has a plurality of openings 45 allowing the passage of filtered fluid having passed through the filtration medium 22. In this example, the tube 15 forms a part of the filtration cartridge 16 and extends in proximity to, and especially in contact with, the filtration medium 22.

The upper end plate 20 has an inner peripheral portion 46 of the first element 30 overlying the tube 15, as can be seen in FIG. 4, and surrounding the filtration medium 22 in its upper end 50. This inner peripheral portion 46 can serve to guide and center the tube 15.

The inner ring 33 of the second element 31 of the upper end plate 20, as can be seen particularly in FIG. 4, overlays the inner peripheral portion 46 of the first element 31, in the extension thereof, and provides the inner seal at this position. The shape of the inner ring 33 can ensure a radial seal on an ad-hoc shape of the head. This radial seal is reinforced during the increase of differential pressure between the intake and outlet circuits of the filtering assembly.

As can be seen in this example, the upper end plate 20 has an outside diameter that is larger than the outside diameter of the filtration medium, so as to provide a substantially cylindrical peripheral space 38 between the substantially cylindrical wall 35 of the vessel 3 and the filtration medium 22. To enable the flow of fluid to be filtered into the peripheral space 38, openings 39, visible in particular in FIGS. 3 and 8, are formed in the upper end plate 20, particularly in the first element 30 of the upper end plate 20.

In the illustrated example the lower end plate 21 forms a plug that covers from the bottom the filtration medium 22 as well as the tube 15, as can be seen in FIGS. 5 and 6 in particular. The plug formed by the lower end plate 21 makes it possible to prevent any filtered fluid from flowing towards the bottom 28 of the vessel 3 in this embodiment.

FIG. 6 illustrates the installation of a filtration cartridge 16, in the direction of the arrow, inside the vessel 3 during a replacement. As can be seen, the head 4 has first been removed in order to insert the replacement filtration cartridge 16 and to enable the reversible rigid connection between the first and second reversible rigid connecting means 25 and 26.

Thanks to the invention, it is not necessary to provide additional sealing means at the periphery of the filter body in order to form the seal with the exterior of the filter body, or to provide means of interior seal to ensure the seal between the head 4 and the upper end plate 20. It is no longer necessary to provide means of holding the filtration cartridge in position other than the upper end plate 20, which also serves this function.

Indeed, the upper end plate 20 provides multiple functions of interior and exterior sealing as well as holding the filtration cartridge in position, in addition to the conventional function of closure of the filtration medium, as in a screw-on filter of the prior art. This makes it possible to reduce the number of components and to simplify the manufacture of the filtering assembly 1.

Also, as a result of the invention it is not necessary to provide a height tolerance of the filtration cartridge 16. Indeed, because the filtration cartridge 16 is, in a manner of speaking, suspended inside the filter body 2 and held by only one side, the height of the filtration cartridge does not interfere with the other components of the filtering assembly 1.

The invention is not limited to the example that has just been described. In particular, the first and second reversible rigid connecting means can cooperate by screwing or force-fit assembly without going beyond the scope of the invention. In the case of force-fit assembly, the vessel and the filtration cartridge remain permanently integral, and the replacement of the filtration cartridge during a maintenance operation involves the simultaneous replacement of the vessel.

It should be noted that drainage means can be provided, in which case the filtering assembly 1 will be modified to do this, without going beyond the scope of the invention.

Throughout the description, the expressions "including a" and "comprising a" should be understood as synonymous with the expressions "including at least one" and "comprising at least one," unless otherwise specified.

The invention claimed is:

1. A removable filtration cartridge configured for housing in a filter body of a filter assembly, the removable filtration cartridge for filtering a circulating fluid and comprising:
    an upper end cap,
    a lower end cap, and
    a filtration medium extending between the upper and lower end caps, the filtration medium having a tubular hole to surround a tube of the filter assembly, wherein the upper end cap is composed of a single part and comprises a first element and a second element, the upper end cap being formed by overmolding of the second element onto the first element,
    wherein the upper end cap has first reversible securing means, and wherein the filtration cartridge is configured to be maintained in position in a receptacle of a filter body of the filter assembly solely by the securing of the first reversible securing means with second reversible securing means of the receptacle.

2. The removable filtration cartridge according to claim 1, wherein the first element is made of a first material and the second element is made of a second material.

3. The removable filtration cartridge according to claim 2, wherein the first material comprises a polyamide resin.

4. The removable filtration cartridge according to claim 2, wherein the second material is chosen from the group consisting of a thermoplastic elastomer, a synthetic or natural rubber, with properties allowing a compression set compatible with a sealing function.

5. The removable filtration cartridge according to claim 2, wherein the second element of the upper end cap is configured to ensure at least one seal with respect to the exterior of the filter body, while also ensuring the seal between a filter head and the upper end cap.

6. The removable filtration cartridge according to claim 1, wherein the first reversible securing means secures to the second reversible securing means by a snap fit.

7. The removable filtration cartridge according to claim 6, wherein the first reversible securing means comprises at least one snap-on tab.

8. The removable filtration cartridge according to claim 1, wherein said securing of the first reversible securing means with the second reversible securing means ensures that the filtration cartridge is held in position laterally and vertically.

9. The removable filtration cartridge according to claim 1, wherein the upper end cap has a generally ring shape with an outside diameter substantially equal to the inside diameter of a substantially cylindrical wall of the receptacle.

10. The removable filtration cartridge according to claim 9, wherein the filtration medium has an outside diameter that is smaller than the outside diameter of the upper end cap, such that a peripheral space is formed between the filtration medium and the substantially cylindrical wall of the receptacle.

11. The removable filtration cartridge according to claim 10, wherein the upper end cap comprises a plurality of openings disposed over a peripheral region of the upper end cap, so as to allow the passage of fluid to be filtered, from a filter head towards the peripheral space.

12. The removable filtration cartridge according to claim 1, wherein the first reversible securing means secures to the second reversible securing means by a screw fit.

13. The removable filtration cartridge according to claim 1, wherein the first reversible securing means secures to the second reversible securing means by a force fit.

14. The removable filtration cartridge according to claim 1, wherein the tube is formed as part of the filter cartridge.

15. The removable filtration cartridge according to claim 1, wherein the second element comprises an outer ring and an inner ring, the outer ring configured to form a seal with the receptacle of the filter body of the filter assembly, the inner ring configured to provide an internal seal to the upper end cap.

* * * * *